April 19, 1949.  M. W. PASCAL  2,467,403
SOLVENT EXTRACTION OF CASTOR OILS
Filed Feb. 7, 1946
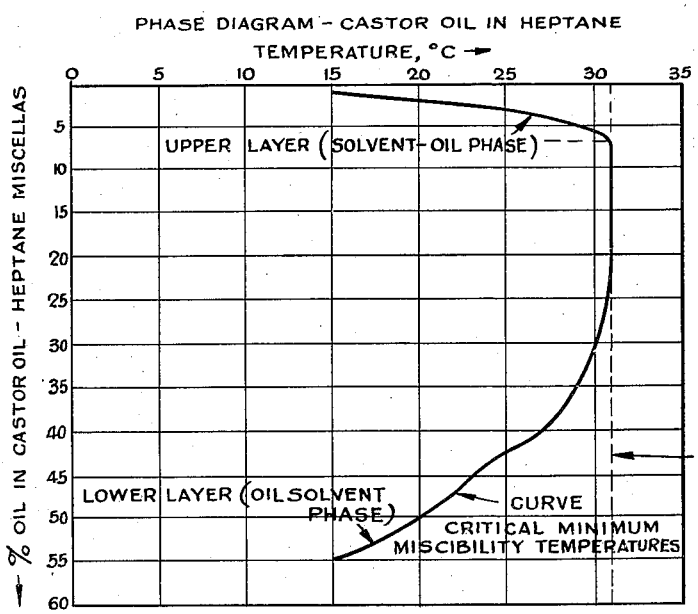
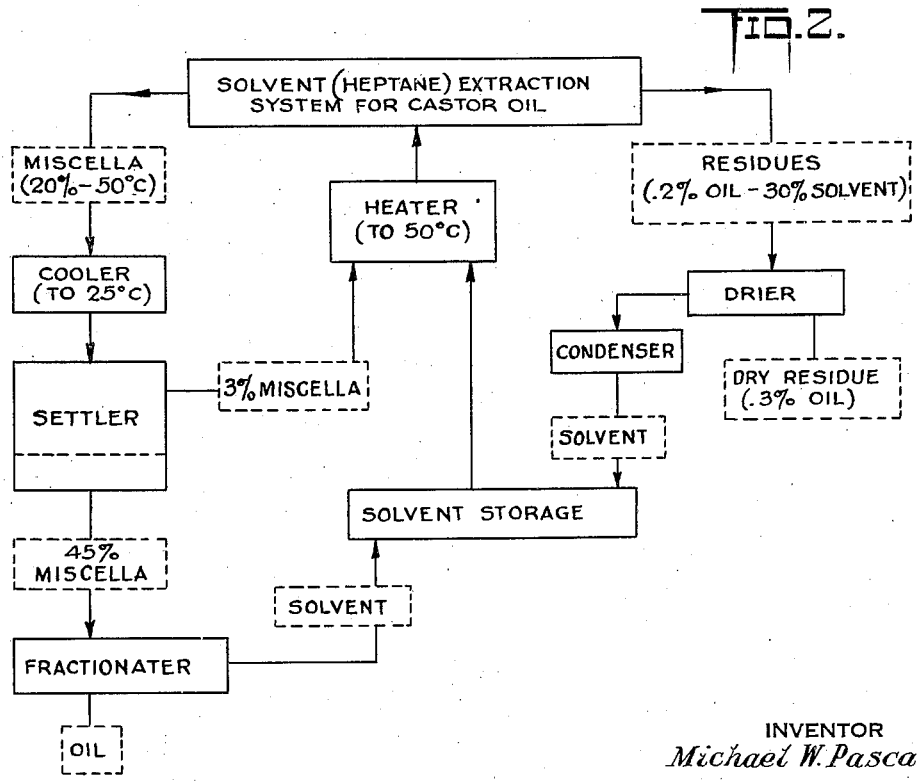
INVENTOR
Michael W. Pascal
BY
Clair W. Fairbank
ATTORNEY Patented Apr. 19, 1949

2,467,403

UNITED STATES PATENT OFFICE 2,467,403

SOLVENT EXTRACTION OF CASTOR OILS

Michael W. Pascal, Shaker Heights, Ohio, assignor to The Sherwin-Williams Company, Cleveland, Ohio, a corporation of Ohio Application February 7, 1946, Serial No. 646,033

14 Claims. (Cl. 260—412.4)

This invention relates to an improvement in the extraction of castor oil, and, more particularly, to a continuous cyclic process of separating castor oil from a miscella of castor oil and a suitable solvent therefor in which the major proportion of the extracting solvent is removed without volatilization. This invention is a continuation-in-part of my copending application for Solvent extraction of vegetable oils, Serial No. 646,034, filed February 7, 1946.

In obtaining castor oil, heretofore, it was the general practice to crush the castor beans and then to press the oily, buttery mass to express a substantial proportion of the castor oil, leaving a residual pomace containing a considerable proportion of oil. To recover the oil in the residual pomace, the pomace was leached batchwise with a castor-oil solvent such as benzine. Successive leachings with benzine were made until the residues were substantially oil-free. The miscella of oil and solvent thus produced was heated to distill off the solvent, leaving the oil. The leached residues, containing a considerable proportion of solvent, were similarly heated to volatilize the solvent, leaving a dry, substantially oil and solvent-free pomace useful as a fertilizing material.

As pointed out in my above identified copending application, the continuous counter-current solvent extraction of oil from castor beans, as from many other oil-containing seeds, except soya beans, has not been successful heretofore, the reason being that the cellular binder and solid matter of the kernel breaks down upon contact with the oil solvent and disintegrates into a finely particled pulp. Such pulp tends to follow the solvent directionally in the usual counter-current solvent extraction processes and large quantities appear as suspended solid matter in the final miscella of oil and solvent. It is extremely difficult to remove such quantities of suspended solids from the miscella or the oil.

In my above identified copending application, I have disclosed my method for continuously solvent-extracting all types of oil-containing seeds. In general, this method is an over-all counter-current process comprised of repeated con-current stages in which the oil-containing seed solids are mixed with a partial miscella obtained from a succeeding stage, except that at the final stage, solvent, rather than a partial miscella, is mixed with the oil-containing solids; such solvent is almost entirely supplied from a conventional solvent recovery system used to recover the solvent volatilized off the final miscella in producing the solvent-free oil. In each repeated stage of the process, a substantially solid-free miscella is separated from the slurry of pulp and miscella, the resulting thickened and compacted pulp then being led to the succeeding stage for repeated treatment with a partial miscella or solvent.

Extraction of the oil content of castor beans with a solvent for castor oil may be successfully carried out in the method described with the production of a miscella carrying only a very minor amount of suspended solids and a dry residue containing not in excess of 1% of oil and usually 0.5% or less. Except as modified by my discovery disclosed below, the castor oil so obtained is recovered from the final miscella by application of heat and/or vacuum to volatilize off the solvent. It is a specific object of this invention to minimize the volatilization of solvent in recovering solvent-extracted castor oil by any solvent extraction system, batch or continuous, and, particularly, to separate, without volatilization, a final castor oil miscella into two fractions, an oil rich fraction (which requires the application of a relatively small amount of heat to volatilize off the solvent and leave solvent-free oil) and a fraction generally so oil-poor that it may be used instead of a distilled solvent in either my above identified process or in other solvent-extraction systems for recovering castor oil. Other objects and advantages of my invention will be apparent from the following specification, claims and drawings, in which Fig. 1 is a phase diagram showing the separation of miscellas of castor oil and a suitable solvent, heptane, into two layers of different composition when cooled below the critical temperatures.

Fig. 2 is a flow sheet showing the separation of castor oil from a miscella of castor oil and heptane in accordance with my invention.

I have found that, by employing solvents of a certain type hereinafter described and generally referred to herein as "suitable solvents," a high efficiency of extraction of castor oil from castor bean may be attained in a cyclic process with the achievement of considerable economic advantages by a reduction of the amount of solvent which must be volatilized to produce a solvent-free oil. These improvements are effected through a characteristic property of castor oil in its behavior to certain solvents, and while the greatest economy is obtained by carrying out the principles of my process in conjunction with a counter-current extraction system such as described in my copending application Serial No. 646,034, these principles may also be employed in batch solvent extraction of castor beans, or oil-containing pomace from which a part of the oil has been removed by expression or otherwise, or in any other suitable procedure for the solvent extraction of castor oil.

I have discovered that when castor oil is mixed with certain oil-solvents above a certain critical temperature, the oil and solvent are miscible, in all proportions, to form a homogeneous, clear mixture or miscella. If this homogeneous miscella be of a suitable proportion and be cooled to a critical point herein termed the critical minimum miscibility temperature, the mixture becomes turbid, and, as the temperature is still further reduced and the mixture is allowed to settle, the miscella separates into two layers, a lower oil-rich layer and an upper oil-poor layer. As the temperature is further reduced below the critical temperature, the lower layer becomes oil-richer and the upper layer becomes oil-poorer. The critical temperature at which turbidity appears and above which the oil and solvent are miscible in all proportions and the ratio of oil to solvent in the two layers at a given temperature below critical all vary according to the particular solvent employed.

In general, my invention contemplates extracting castor beans, prepared castor beans, or castor bean pomaces containing some oil, such as result from partial extraction of the oil by pressure or extrusion methods, with a "suitable solvent" (as defined below), and at a temperature above the critical minimum miscibility temperature, that is, at a temperature above that at which a mixture of castor oil and the solvent show a turbidity due to the separating out of a castor oil-solvent phase richer in oil than the whole miscella; separating the non-extractable residues from the homogeneous miscella; cooling the miscella to a point below the critical minimum miscibility temperature to separate the major portion of the oil in the miscella into an oil-solvent fraction (containing the major proportion of the oil in homogeneous mixture with a portion of solvent) and a solvent-oil fraction (containing the major proportion of the solvent in homogeneous mixture with a small amount of oil); heating the solvent-oil fraction to the extraction temperature and returning it to the extraction system; separating the solvent from the oil-solvent fraction (as by heating) for return to the extraction system; and withdrawing the castor oil remaining after separation of the oil from the oil-solvent fraction.

For purposes of use in my new process, a suitable solvent is one which, when mixed with castor oil, will produce a suitable miscella characterized by having a critical temperature point at which the mixture shows turbidity, above which temperature the miscella is homogeneous and at or below which temperature the miscella will separate into two layers, one layer containing a relatively large proportion of oil to solvent and the other layer containing a relatively large proportion of solvent to oil. Thus, the term "suitable solvent," as used in this specification, is used to mean a solvent which behaves with castor oil as thus described. In carrying out my process I prefer to use, as suitable solvents, those hydrocarbons which are liquid at ordinary temperatures and pressures and have boiling points within a general range of about 60° to 250° C. Although solvents of higher or lower boiling point may be employed by using pressure or vacuum equipment of suitable design, by using the solvents within my preferred range, initial equipment cost is at a minimum and operations may be carried out with greatest ease and economy. As especially preferred solvents I employ those aliphatic hydrocarbons having from six to eight carbon atoms and boiling between 60° and 250° C., or mixtures principally comprised of such hydrocarbons. Specifically, I have found hexane, heptane, octane, their isomers, and mixtures principally comprised of hexane, heptane, octane, and/or their isomers especially suitable as castor oil solvents in my process.

The phase diagram shown in Fig. 1 of the drawings sets forth the critical minimum miscibility temperatures of suitable castor oil-heptane miscellas as well as the proportions of oil and solvent in both the upper layer, or solvent-oil phase, and the lower layer, or oil-solvent phase, when the temperature of any suitable miscella is reduced below its critical miscibility temperature. That is, within a given range of proportions of oil to suitable solvent, there is a critical minimum miscibility temperature for each miscella falling within that range. When such a miscella is reduced to any temperature below its critical minimum, the initial or whole miscella will separate into two layers or phases, in each of which the proportion of oil to solvent will be that shown by the phase diagram. Further, and perhaps more surprising, at a given temperature below critical, the proportion of oil to solvent in the upper phase will be the same and the proportion of oil to solvent in the lower phase will be the same for all miscellas so separated at that temperature, regardless of the initial proportions of oil and solvent in the miscellas so separated. Thus, while the phase diagram holds true for all suitable miscellas, it is to be understood that the term "suitable miscella" as used in this specification and claims is to be understood to mean an initial miscella having a lesser amount of oil than would be present in the lower phase, and a lesser amount of solvent than would be present in the upper phase, at the temperature to which the initial miscella is to be reduced; in short, a "suitable miscella" is an initial miscella of a proportion of oil to solvent included between the upper and lower phase proportions at the temperature to which the miscella is to be reduced. Applying the foregoing to the phase diagram shown in Fig. 1:

(a) Castor oil and the particular grade of heptane employed in deriving the diagram are miscible in all proportions above the maximum critical miscibility temperature, 31° C. to form clear, homogeneous solutions or miscellas.

(b) When castor oil and the heptane employed are mixed in proportions varying from approximately 8% to 22% oil, if such miscellas are reduced to the critical temperature of 31° C., the miscellas will become turbid and, upon further reduction of temperature, the miscellas will separate into upper and lower phases in which the proportions are those shown for the given temperature below the maximum critical.

(c) Any miscella of the heptane and castor oil of greater than approximately 22% oil will remain a clear miscella until either the critical minimum miscibility temperature for that miscella is reached or the miscella freezes. Thus, for example, an initial miscella of 31% oil is not a "suitable miscella" unless its temperature is to be reduced below 30° C.; if so the 31% miscella is a "suitable miscella" and continued reduction of temperature below 30° C. will cause it to separate into phases of the proportions shown. Similarly a 5% miscella is not a "suitable miscella" unless its temperature is to be reduced below the critical temperature shown therefor, namely, 29° C.

The heptane used in deriving the above described phase diagram was a standard commercial grade of sp. gr. 60/60 F. 0.6582, boiling range 67–70° C., Kauri butanol value 32.0 cc., aniline cloud point 58.9° C. The ordinary commercial grades of the preferred aliphatic hydrocarbon solvent may vary considerably in purity and are usually mixtures of the specified hydrocarbons and other hydrocarbons of nearly the same boiling point. It is to be understood in this specification and the appended claims that I mean the terms "hexane," "heptane," "octane" and the like to include the available commercial grades and mixtures principally comprised of the specific hydrocarbons named.

For the extraction of the oil from castor beans I have found it desirable to operate at a temperature somewhat above the critical minimum miscibility temperature, as the rate of extraction increases with higher temperatures. I prefer to use an extraction temperature found by experiment to extract 98% or more of the available oil from finely powdered castor bean kernels in 5 minutes or less, namely, with commercial grades of hexane, heptane and octane the temperature required to effect 98% or better extraction in 5 minutes was found to be 65°, 50°, and 80° respectively. Lower or higher temperatures may be employed by varying the time of extraction, if desired. With hexane at 60° C., for instance, 98% extraction required 30 minutes, while at 50° C. and 40° C. only 90% and 65%, respectively, was extracted in 30 minutes. With the heptane at 40° C., 90% was extracted in 30 minutes. I am unable to account for the peculiar effectiveness of heptane.

The great advantage in utilizing the phenomena described above lies in applying them to a cyclic solvent extraction process wherein it is necessary to volatilize only a part of the solvent in the extraction miscella to produce solvent-free castor oil. With heptane as the solvent, cooling of a 20% miscella to about 20° C., for instance, separates a lower layer of oil-rich 52% miscella carrying 94% of the total oil and only 22% of the solvent. The upper layer of oil-poor 2% miscella, carrying 6% of the total oil and 78% of the solvent, may be returned to the extraction system as partial miscella without separating the oil.

In order to explain more clearly one manner of operating by my method, the following description is set forth, but it is to be understood that the specific solvent and the operating conditions given in therein are not to be construed as limiting.

Castor beans may be decorticated and the kernels treated in an attrition mill with just enough miscella from the extraction system to produce a thick pulp. The pulp is fed continuously to a counter-current extraction system such as is described in my copending application Serial No. 646,034, using a commercial grade of heptane as solvent. The overall feed of kernels and heptane is maintained in such ratio that for each 20 parts by weight of oil in the kernels 80 parts by weight of heptane is used, the temperature of extraction being maintained at about 50° C. The resulting miscella withdrawn from the system contains approximately 20% oil and carries only a minor portion of suspended solids if the method disclosed in my said application is employed for extraction. A portion of the withdrawn miscella is returned for mixing with more kernels and the balance is treated according to my oil separating system shown in the flow sheet of Fig. 2 of the drawings as follows: The withdrawn 20% miscella from which the solvent is to be extracted is led to a cooler in which the miscella is cooled below the critical minimum miscibility temperature to 27° C. for example. The cooled miscella is then allowed to settle in a settler tank, where it separates into an upper 3% solvent-oil phase miscella and a lower 45% oil-solvent phase miscella. The 45% miscella, containing 91% of the oil in the initial 20% miscella and only 25% of the solvent, is drawn from the settler and the solvent is separated in a suitable fractionator, as by distilling, leaving solvent-free castor oil. The economy effected by my invention should be obvious; by cooling the initial miscella from 50° to 25° C., i. e. to slightly more than the usual room temperature, instead of following the usual practice of heating all the initial miscella for distillation, only one-fourth of the solvent is required to be distilled. The 3% miscella withdrawn from the settler is reheated to the extraction temperature of 50° C. and may be then fed into the final stage of my solvent extraction system as described in my said application as a partial miscella rather than the distilled solvent as disclosed in that application. Several economies may be obtained in reheating the 3% miscella, as by diluting it with hot solvent recovered from the fractionator from which oil is withdrawn. Additional solvent is recovered from the drier in which the wet residues of the extraction system are dried; the dried non-extractable solids of the castor bean kernels are useful as fertilizing materials.

While my castor oil separating system has been described in connection with my above identified counter-current solvent extraction system, it should be apparent from Fig. 2 of the drawings that my separating system which is the subject of this application may be used in connection with any other type of system for extracting castor oil with suitable solvents. It is to be understood, therefore, that my invention is not limited to the specific embodiment disclosed but is limited only by the following claims.

What is claimed is:

1. In the production of castor oil by solvent extraction, the steps of forming a miscella of castor oil and aliphatic hydrocarbon solvent therefor in a liquid state, said miscella having a temperature and a castor oil-solvent ratio located within the area to the right of the critical minimum miscibility curve for the said solvent and castor oil as characterized by the accompanying phase diagram, said solvent being maintained above the critical minimum miscibility temperature for the miscella during the formation of the miscella, cooling said miscella below the critical minimum miscibility temperature therefor, at which temperature the miscella becomes turbid, and allowing the miscella to separate into an oil-rich phase and an oil-poor phase, and then withdrawing said oil-rich phase 2. In the production of castor oil by solvent extraction from oil-containing castor bean material, the steps of forming an initial clear miscella or aliphatic hydrocarbon solvent and castor oil, said miscella having a temperature and a castor oil-solvent ratio located within the area to the right of the critical minimum miscibility curve for the said solvent and castor oil as characterized by the accompanying phase diagram, said aliphatic solvent boiling between 60° and 250° C., cooling said miscella below said critical temperature, and allowing the miscella to separate into an oil-rich phase and an oil-poor phase, withdrawing the oil-poor phase for use in forming the initial miscella, withdrawing the oil-rich phase, and separating the solvent in the oil-rich phase to produce a substantially solvent-free castor oil.

3. In the production of castor oil by solvent extraction from oil-containing castor bean solids, the steps, in a solvent extraction system, of leaching the oil-containing solids with a solvent comprised of aliphatic hydrocarbons boiling between 60° and 250° C., maintaining, during said leaching, said solvent at a temperature and in such quantity as to form a miscella having a temperature and solvent-castor oil ratio located within the area to the right of the critical minimum miscibility curve for said solvent and castor oil as characterized by the accompanying phase diagram, separating said miscella from the extracted seed solids, and then cooling the miscella to a temperature at which the miscella will separate into an oil-poor phase containing a minor proportion of the oil and a major proportion of the solvent in the miscella and into an oil-rich phase containing the remaining oil and solvent in the miscella, allowing the cooled miscella to settle into said phases, withdrawing and reheating the oil-poor phase for return to the extraction system, withdrawing the oil-rich phase and volatilizing off the solvent therein to produce a substantially solvent free castor oil, and condensing the volatilized solvent vapors for recovery and return of the solvent to the extraction system.

4. The process as defined in claim 1 in which the solvent is principally comprised of aliphatic hydro-carbons having from six to eight carbon atoms.

5. The process as defined in claim 1 in which the solvent is principally comprised of heptane.

6. The process as defined in claim 1 in which the solvent is principally comprised of hexane.

7. The process as defined in claim 1 in which the solvent is principally comprised of octane.

8. The process as defined in claim 3 in which the solvent is principally comprised of aliphatic hydro-carbons having from six to eight carbon atoms.

9. The process as defined in claim 3 in which the solvent is principally comprised of heptane.

10. The process as defined in claim 3 in which the solvent is principally comprised of hexane.

11. The process as defined in claim 3 in which the solvent is principally comprised of octane.

12. In the process of extracting oil from castor beans, the steps of triturating castor bean solids; repeatedly and in successive extracting stages: (1) forming a slurry of oil-containing bean solids and a castor oil solvent comprising, except in the final stage, a partial miscella obtained from a succeeding stage, (2) separating said slurry into a substantially solid-free miscella and a thickened pulp comprised of solids and miscella, (3) compacting said pulp, and (4) passing said pulp to a succeeding stage, except in the case of the final stage where the pulp is removed from the extracting stages; withdrawing miscella from the initial extracting stage, cooling said miscella and forming an oil-poor phase and an oil-rich phase therefrom; withdrawing the oil-rich phase and separating solvent therefrom to produce a substantially solvent-free castor oil; reheating the oil-poor phase and returning it to an extracting stage; introducing oil-free castor oil solvent into at least one of said stages, said oil-free castor oil solvent being principally comprised of liquid aliphatic hydrocarbons containing from 6 to 8 carbon atoms; and controlling the temperature of the aliphatic hydrocarbon solvent and the ratio thereof to oil to produce, in the initial stage, a miscella having a temperature and castor oil-solvent ratio located within the area to the right of the minimum miscibility curve for the solvent and castor oil as characterized by the accompanying phase diagram.

13. The process as defined in claim 12 including the step of recoverying the solvent separated from the said oil-rich phase and returning it to an extracting stage, recovering solvent from the pulp removed from the final stage, and returning said recovered solvent to an extracting stage.

14. The process as defined in claim 13 including the step of withdrawing a portion of the miscella produced in the initial extracting stage and mixing it with decorticated castor bean solids during the step of triturating said castor bean solids.

MICHAEL W. PASCAL.

REFERENCES CITED

The following references are of record in the file of this patent:

UNITED STATES PATENTS

| Number | Name | Date |
|---|---|---|
| 1,892,366 | Sato et al. | Dec. 27, 1932 |
| 2,183,837 | Hamilton et al. | Dec. 19, 1939 |
| 2,200,391 | Freeman | May 14, 1940 |
| 2,377,975 | Singer et al. | June 12, 1945 |
| 2,377,976 | Singer et al. | June 12, 1945 |

FOREIGN PATENTS

| Number | Country | Date |
|---|---|---|
| 336,274 | Great Britain | Oct. 10, 1930 |

OTHER REFERENCES

Markley et al., Soybean Chemistry & Technology (1944), Chemical Pub. Co., Brooklyn, N. Y., pages 193–4.

Dean, Utilization of Fats (1938), Chemical Publishing Co., New York, New York, page 152.

Jamieson, Vegetable Fats and Oils, 2nd edition (1943), Reinhold Publishing Co., pages 48 to 50.